United States Patent [19]

Nagel

[11] Patent Number: 6,071,317
[45] Date of Patent: Jun. 6, 2000

[54] OBJECT CODE LOGIC ANALYSIS AND AUTOMATED MODIFICATION SYSTEM AND METHOD

[75] Inventor: Robert H. Nagel, New York, N.Y.

[73] Assignee: Digits Corp., N.Y.

[21] Appl. No.: 09/208,148

[22] Filed: Dec. 9, 1998

Related U.S. Application Data

[60] Provisional application No. 60/069,211, Dec. 11, 1997.

[51] Int. Cl.$^7$ .................................................... G06F 9/445
[52] U.S. Cl. ........................ 717/4; 717/1; 717/2; 717/3; 717/5; 717/6; 717/7; 717/8; 717/9; 717/10; 717/11
[58] Field of Search ..................................... 395/701, 702, 395/703, 704, 705, 706, 707; 717/1, 2, 3, 4, 5, 6, 7, 8, 9, 11

[56] References Cited

U.S. PATENT DOCUMENTS

| | | | |
|---|---|---|---|
| 4,954,941 | 9/1990 | Redman | 364/200 |
| 5,175,828 | 12/1992 | Hall et al. | 395/375 |
| 5,359,730 | 10/1994 | Marron | 395/650 |
| 5,459,866 | 10/1995 | Akiba et al. | 395/650 |
| 5,481,713 | 1/1996 | Wetmore et al. | 395/703 |
| 5,495,612 | 2/1996 | Hirayama et al. | 395/700 |
| 5,507,030 | 4/1996 | Sites | 395/800 |
| 5,555,418 | 9/1996 | Nilsson et al. | 395/700 |
| 5,600,836 | 2/1997 | Alter | 395/612 |
| 5,630,118 | 5/1997 | Shaughnessy | 707/1 |
| 5,644,762 | 7/1997 | Soeder | 707/6 |

(List continued on next page.)

OTHER PUBLICATIONS

"Storing All Dates in Character Format", IBM Technical Disclosure Bulletin, Jul. 1991, 83–84.

IBM Technical Disclosure Bullentin vol. 312 No. 1 Dual Indirect RAM/ROM Jump Tables for Firmware Updates, Jun. 1988.

IBM Technical Disclosure Bulletin vol. 27 No. 4a Method of Customizing Patches For Each Hardware Configuration, Sep. 1984.

IBM Technical Disclosure Bulletin vol. 35 No. 7 Method and Mechanism For Dynamic Loader, Dec. 1992.

Code Complete Steve McConnell pp. 379–380, 1993.

Fuzzt–Neural Control Junhong and Linkens pp. 1–9 and 34–36, 1995.

*Primary Examiner*—Tariq R. Hafiz
*Assistant Examiner*—Ted T. Vo
*Attorney, Agent, or Firm*—Milde, Hoffberg & Macklin, LLP

[57] ABSTRACT

A method and system for modifying computer program logic with respect to a predetermined aspect, comprising (a) before run time: analyzing compiled computer program logic of a module for processes involving the predetermined aspect before run time, substantially without decompilation or reference to computer program source code; and storing a set of modifications relating to computer program logic modifications of the module relating to the predetermined aspect; and (b) at run time: based on the stored set of modifications, selectively transferring program control from the module to a separate logical structure, executing modified logical operations with respect to the predetermined aspect, and subsequently returning program control to the module. The predetermined aspect may be, for example, a data type, algorithm type, or interface specification. In a preferred embodiment, the predetermined aspect is date related data, and more particularly, to logical operations relating to date related data which are flawed. The system preferably operates in a mainframe environment, wherein the compiled computer program constitutes one or more load modules, executing under an operating system, wherein the computer program logic modifications preferably comprise program flow control diversions in an original object module, which selectively transfer logical control to a separate object module to effect modifications to the computer program logic, followed by a return of control to the original object module.

31 Claims, 1 Drawing Sheet

U.S. PATENT DOCUMENTS

| | | | |
|---|---|---|---|
| 5,649,203 | 7/1997 | Sites | 395/709 |
| 5,659,751 | 8/1997 | Heninger | 395/685 |
| 5,668,989 | 9/1997 | Mao | 707/101 |
| 5,682,533 | 10/1997 | Siljestroemer | 395/616 |
| 5,719,826 | 2/1998 | Lips | 368/29 |
| 5,737,735 | 4/1998 | Soeder | 707/6 |
| 5,740,442 | 4/1998 | Cox et al. | 395/704 |
| 5,758,336 | 5/1998 | Brady | 707/6 |
| 5,758,346 | 5/1998 | Baird | 707/101 |
| 5,761,668 | 6/1998 | Adamchick | 707/101 |
| 5,765,145 | 6/1998 | Masiello | 707/1 |
| 5,790,856 | 8/1998 | Lillich | 395/703 |
| 5,794,048 | 8/1998 | Brady | 395/705 |
| 5,797,117 | 8/1998 | Gregovich | 707/101 |
| 5,802,354 | 9/1998 | Kubala et al. | 713/400 |
| 5,806,063 | 9/1998 | Dickens | 707/6 |
| 5,806,067 | 9/1998 | Connor | 707/100 |
| 5,808,889 | 9/1998 | Burgess | 708/530 |
| 5,809,500 | 9/1998 | Nolan | 707/6 |
| 5,812,841 | 9/1998 | Soeder | 707/6 |
| 5,812,849 | 9/1998 | Nykiel et al. | 395/701 |
| 5,828,890 | 10/1998 | Rehbock et al. | 710/260 |
| 5,835,909 | 11/1998 | Alter | 707/101 |
| 5,838,979 | 11/1998 | Hart et al. | 395/707 |
| 5,845,286 | 12/1998 | Colizza | 707/101 |
| 5,852,824 | 12/1998 | Brown | 707/6 |
| 5,862,380 | 1/1999 | Brady | 395/704 |
| 5,878,422 | 3/1999 | Roth et al. | 707/100 |
| 5,897,633 | 4/1999 | Nolan | 707/6 |
| 5,898,872 | 4/1999 | Richley | 395/703 |
| 5,903,895 | 5/1999 | Hoffman et al. | 707/101 |
| 5,911,142 | 6/1999 | Smith et al. | 707/101 |
| 5,930,506 | 7/1999 | Bieler | 395/704 |
| 5,930,782 | 7/1999 | Shaughnessy | 707/1 |
| 5,950,197 | 9/1999 | Beam | 707/6 |
| 5,956,510 | 9/1999 | Nicholas | 395/701 |
| 5,970,247 | 10/1999 | Wolf | 395/704 |
| 5,978,809 | 11/1999 | Bemer | 707/101 |

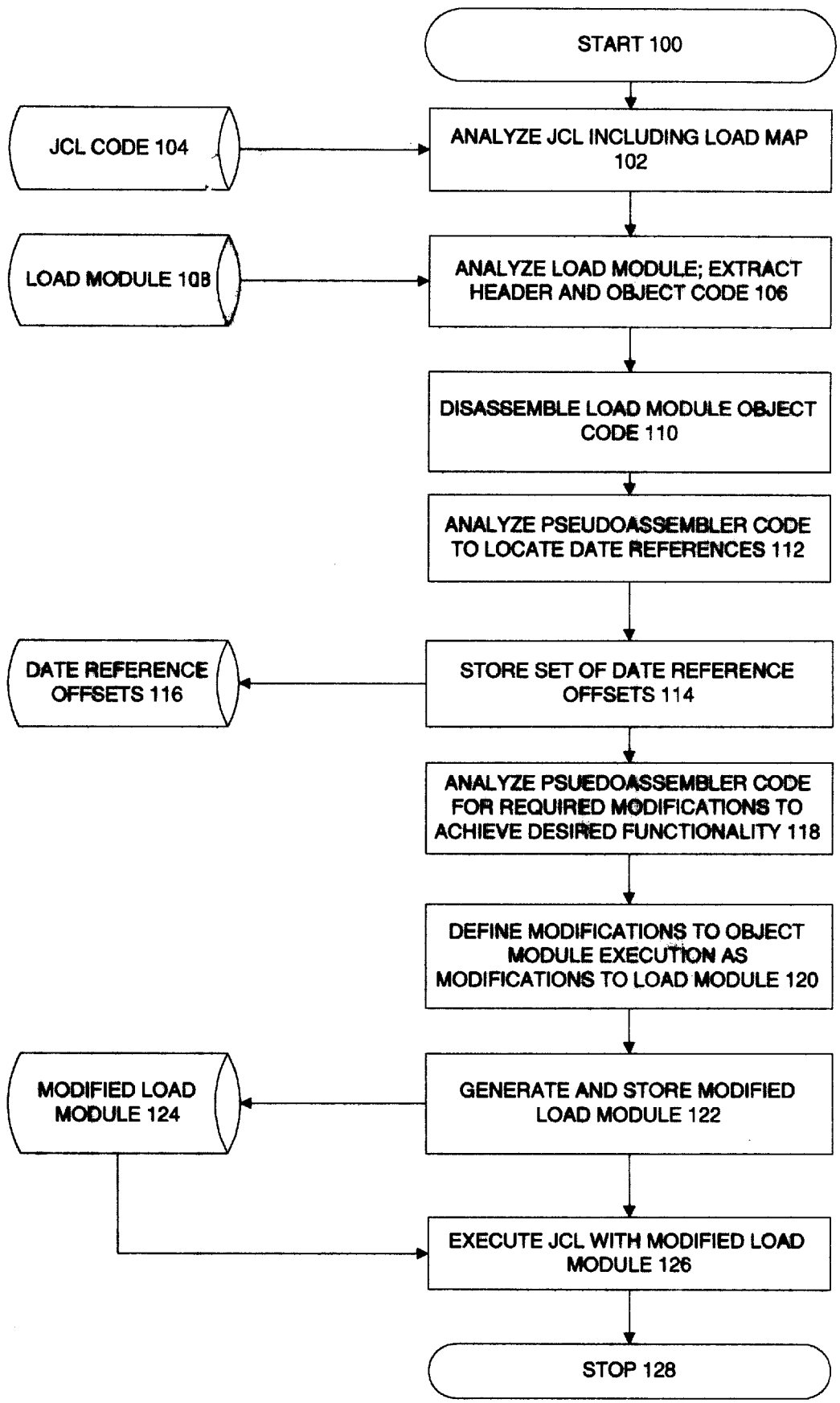

OBJECT CODE LOGIC ANALYSIS AND AUTOMATED MODIFICATION SYSTEM AND METHOD

This application claims benefit of Provisional application Ser. No. 60/069,211 filed Dec. 11, 1997.

FIELD OF THE INVENTION

The present invention relates to the field of systems and methods for the automated detection and remediation of object code errors or anomalies, and in a preferred embodiment to systems for addressing the so-called "millennium bug" present in computer software systems.

BACKGROUND OF THE INVENTION

The software development process typically begins with a statement of the intended functioning of a software module, i.e., a statement of the problem. From this statement, a high level analysis is performed to determine the basic steps necessary to carry out the intended functionality. These high level steps are then further analyzed and translated into a computer language program. In many instances, the computer program interacts with the computer operating system, hardware, and/or other programs operating in the computer system.

Often, events occur after a final program is debugged, compiled, and linked, which alter the operation of the software, or make latent defects in the operational logic or code apparent. One such instance is the so-called "Year 2000 Problem", or Y2K problem. This issue is insidious, because existing and operational code with no present deficiency, must be analyzed and appropriately replaced or remediated before certain critical dates, or be at risk of failure. Since many computer systems are interrelated and depend on each other for operation, the failure of even small or remote systems may lead to a "domino effect", resulting in failure of related and more important systems. Some failure modes are relatively minor, with inconvenient consequences, while others are catastrophic, stopping operation of the computer system, or worse, causing a failure of a real system controlled by the computer system. Where the computer system is an embedded controler or otherwise mission critical, the software or firmware errors may lead to death or destruction. For example, utility, elevator, flight control and even medical equipment and systems often have embedded controlers. Even where the date information is ancillary to the main function, a date reference which reveals a program logical error may lead to failure of an entire system. Where this is most apparent is where a system logs events or performs trend analysis. If there is an inconsistency in dealing with date data, the result could be a shutdown or erroneous operation. In fact, legacy embedded systems may particularly present this problem, because in the past, program memory was at a premium and therefore conservation of resources by compressing or truncating date information was employed, even where this meant a critical limitation on system design life.

As discussed in detail below, many stable computer systems, particularly mainframe computer systems running immense and complex code, will suffer from the Y2K problem. This is a result of the use and reuse of legacy code and the persistence of efficiency techniques and assumptions which will no longer be valid early in the third millenium. When confronted with this problem, two significant considerations are the availability of accurate source code for the software to be analyzed and corrected, and the testing and debugging of replacement software to ensure that the functionality is correct, the corrected software remains compatible with systems to which it interfaces, and no new errors are introduced. Another consideration is the time and resources required to perform remediation, even where the source code and testing environment are available.

There are a number of other, similar types of problems to the Y2K problem. Essentially, the class of problems arise because existing debugged compiled program code, for which the source code may be unavailable or inconvenient, or merely voluminous, becomes defective due to a relatively rare occurrence of a definable event. Other examples include program or operating system updates or partial updates, desired substitution of elements which would not effect fundamental program flow or logic, and translation of parameter sets to ensure operation in a new environment. Particularly, a problem often occurs in Microsoft Windowstype operating systems, e.g., Windows 3.X. Windows 95, Windows 98, Windows NT, Windows CE, and other variants, in which programs typically reference dynamic link libraries or DLLs, visual basic objects or VBX, or other code, which effectively becomes integrated with the operating system, and is often stored in a predetermined path with such DLLs and VBXs from other programs. In this case, where such common code is referenced by a single name, it is possible, and even likely that an updated version of the VBX or DLL by the same name will not operate with older software, and newer software will not operate with an older DLL or VBX. Similar problems occur in other circumstances and under other operating systems, mandating synchronized updates of multiple system software components.

Another instance of this problem is the potential rise of the Dow Jones index above 10,000, which may lead to an extra digit required for representing the value in existing software which is otherwise fully functional. A further instance is the change in currency units in Europe to the ECU.

Precisely defined, the Year 2000 (Y2K) Problem is the insufficient representation of the year datum as a 2 digit field (or variable) in software applications and their associated data files and data bases, the incorrect calculation of the leap year status, the inappropriate assumption of "1900" or some other year as a base year or "1999" as the final year, and the inaccurate programming of date calculations with respect to these inaccuracies, including computations, comparisons, assignments and other operations. The year 2000 is a leap year, unlike 1900. Normally century boundaries are not leap years; there are several exceptions to this rule, one of them is if the year is divisible by 400 in which case it is a leap year. Identification of date data and date calculations is complicated by the use of pointers and arrays, obfuscated by the lack of standard naming conventions and masked by embedding in other data fields. As a result, the software in affected applications may incorrectly assume that the maximum legal value of the year field is "99" or may incorrectly perform sorts and other operations that involve years designated by "00". Negative time duration could result from subtractions from "00" (assumed to be year 2000). Incorrect leap year calculations will incorrectly assume that February $29^{th}$ does not exist in the Year 2000. Thus, in the year 2000, (or with some applications even earlier), when the year field is incremented, many date dependent computer algorithms that assume the year field will increase monotonically, and will produce erroneous results or cause abnormal program termination, with possible disastrous consequences. Possible deleterious consequences for affected applications range from outright application failure, to the production of incorrect results or aberrant behaviors, such as the generation of faulty schedules, incorrect trajectories, or flight paths, the failure of time sensitive safeguards in embedded systems, the generation of incorrect paychecks, contract transactions, mortality or morbidity from failure of medical equipment or pacemakers, or payment calculations in commercial applications. Since virtually every major application deals with dates and there is widespread encoding of the year as a two digit field, the likelihood that an application is affected by the Y2K 2000 date problem is very high. Indeed it is foolish, and in many cases life threatening, to assume that any mission-critical application is not potentially affected by the Y2K Problem. Another common oversight is the assumption that newer applications are not affected. Since programmers hardly ever start from scratch, newer applications are frequently contaminated through their use of date and duration. Newer systems often have to use the data structures of older systems, since they provide a new function to be preformed on an already existing system and associated data. Further, programming tools and operating systems may be flawed, resulting in failures even where the source code program itself does not contain explicit non-Y2K compliant logic.

As the Year 2000 approaches, most organizations across the country have been wrestling with the problem of reprogramming date-dependent systems. Date-dependency refers to how most programs depend on the manner in which dates are represented in order to run computations. Many legacy software systems provide insufficient representation of date information to avoid ambiguity, and in particular, this problem arises either due to limited indexing address space or to the common abbreviation of a year as a pair of digits. Thus, as 1999 ends, a new date with a two digit year representation will be ambiguous between 1900 and 2000. For example, one common date format in COBOL programs represents Feb. 26, 1990 as 900226, and Jan. 1, 1991 as 910101, allowing the computer to compare the two numbers and correctly assume that the smaller number represents the earlier date. On Jan. 1, 2000, or 000101, however, those comparisons will be invalid.

Likewise, programs which calculate the day of the week using only the last two digits of the year will get wrong answers for Jan. 1, 2000, and all subsequent dates. This is because the formulas they use implicitly assume that the dates are in the 1900s. Jan. 1, 1900, was a Monday, but Jan. 1, 2000, will be a Saturday.

Another problem arises in systems which use a date as part of the key of an indexed file. This becomes a problem if the date has a two-digit year and the application depends on records in the file being in chronological order. Even if processing of the data does not depend on the records being in chronological order, it could result in records being listed in the wrong order in reports or on-screen displays. In 2000 and later, an application that is supposed to show the most recent items at the top, or on the first screen, would show the items on the bottom or on the last screen.

The digit pairs "00" or "99" may be handled by special software routines, in which they may refer, for example, not to a date but rather to a null value or have other significance. Sorting on date is a special case, as discussed below. Reports and screens should therefore be looked at on a case by case basis to ensure readability. There could be bugs there as well, such as hard-coding "19XX" or zero-suppressing the year.

There are three common approaches to remediate the software, which are subject to these and other date-ambiguity issues. The first is a complete replacement of two digit date codes with four digit date codes, (YYYY) or year and century codes (CCYY) with all accompanying changes necessary in the source codes of the program as well as necessary changes in the data files. The second approach is a logical analysis of a date representation to determine a most probable interpretation, allowing continued representation of dates as codes which occupy the same data space as two digits. Typically, the analysis provides a sliding window or pivot date, in which a continuous 100 year date range is supported, which does not necessarily coincide with the century break. Note also that a date window can, when a minimum value can be applied for the calculation, handle a range greater than 100 years, e.g., if you have no maximum retirement age, but have a minimum of, say, 16, then if in 1995 you encounter a birth date of 90 you could infer an age of 105 years, not 5. The third technique is compression of date data, in which a larger date range is stored in the same number of bits as the original date code. For example, by allowing an available 4 bits often used to represent the upper digit from 0–9, instead represent the upper hex digit from "0" hex to "f" hex', the years 1900–2059 can be represented. Further by using a binary representation for 8 bits, a 255 year span can be represented; if 14 bits corresponding to 2 ASCII digits are available then a year span from 0–16,000 can be represented.

For example, a standard date routine may be provided using a sliding date window to infer the century in performing calculations on 2-digit years. The 00–99 range is divided into a 25-year forward portion (projected dates), and a 75-year backward portion (current year and 74 past years). The routine, for example, calculates a "forward century" (add 25 to current 4-digit year, take two high order digits), a "forward century endpoint" (same calculation, low order digits), and a "backward century" (subtract 75 from the current century).

The most obvious solution to many Y2K problems involves increasing the data format of date fields from 2 to 4 digits in every affected application system. However, this is astronomically expensive, and it is may be unnecessary. The conversion to four digit year representations requires both changes to data and programs by converting all references and/or uses of 2-digit-year format (YY) to a 4-digit year format (YYYY or CCYY). It also requires converting all software pro grams to use the new date format and the use of "bridging" mechanisms to perform conversions between old and new data and programs. While this solution is preferable, ensuring that applications will operate correctly for the next 8,000 years, it has some notable drawbacks. The requirement to convert data formats requires every program that references date data to be modified and every data base that contains date data to be modified and bridged. Positional references to adjacent data fields may have to be adjusted. All record formats of records containing date data have to be changed. All data files, including historic data files have to be reformatted and rewritten. Performance may be impacted by increased processing times for bridge programs. Hard disk storage space requirements may double during data base conversion, for duplicated data files. Coordination is required with system owners of all external systems affected by changes to interfaces or shared databases to achieve simultaneous switch over to the updated date data format between multiple communicating systems. The date field format change requires all affected program logic, including declarations, moves, calculations and comparisons to be examined for year 2 to 4 digit expansion side-effects.

The sliding window technique requires changes to programs only; no data format changes are required. The data itself however, needs to be modified. The sliding window technique uses an advancing 100-year or 10-year interval. The century or decade of a given year are unambiguously determined by comparing the value in a 1-digit or 2-digit year field against an "application window" that has a fixed upper and lower year boundary that can be periodically adjusted. The size of the "window" for an application depends upon whether the application works with a 100 years or 10 years worth of data. The period of adjustment of the window depends upon a number of factors, including the encoding technique. Some techniques require adjusting the window boundaries every year, or at less frequent intervals of 5, 10, 30, 50 or a 100 years. The "Sliding Window" technique allows the span of years which an application processes to be indefinitely extended by periodically changing the window boundaries and notifying users that the window is about to advance. Adaptation of existing applications to use the sliding window technique requires some extra overhead and code logic around date sorts, collations, literal comparisons and computations to correctly perform the mapping of a 2-digit date into the application "window" and to assure that computations are correctly performed. However, it avoids most of the massive change and inter-organizational coordination associated with the 2-digit (YYMMDD) to 4-digit (YYYYMMDD or CCYYMMDD) date format conversion approach. By using a sliding window technique, many existing applications can be adapted to process dates using a 100 year sliding window, and will have a correct date interpretation for at least another 65 years without requiring any modifications to existing data bases.

Unfortunately, it may be quite difficult to create a realistic test environment to assess Y2K effects. It may not be easy to simply roll the clock forwards to see what happens. Setting a computer's internal clock forward may not just cause application failure on account of the date problem. For example, many software packages are licensed with time stamps that limit how long they can be used. Licensed software may not be licensed to run after the year 2000. In addition, it may not be possible to roll the clock backwards after rolling it forward because of irreversible changes made by applications to data files in future time that retroactively contaminate the usage of the application in present time. To isolate on-going operations from such contamination a completely isolated "time machine" is desired to evaluate and test Y2K year roll-over consequences.

Even with sophisticated software tools, fixing the Year 2000 problem is an extraordinarily expensive and complex undertaking. The domain modeling task to identify date fields for even a single moderately sized application requires scanning virtually every line of application code, and examining every data declaration or usage to determine if it is date related. Often the usage of date names and computations are obscured or ambiguous even in source code because of the use of acronyms that mask the meaning of application data. Furthermore, determining the meaning of a specific date calculation or a datum occurring in a program is an example of a problem that is known in the software reverse engineering research community as the "program understanding problem." Program understanding is considered to be an extremely difficult problem for which no fully automated solution is known to exist, because it requires the correct assignment to a set of program constructs, that can take a large variety of different algorithmic forms, of a real world interpretation that is known only to humans.

Another issue which arises in remediating programs relates to ownership and copyright. Often, programs are licensed by a user, who typically may have less than full ownership of the software, and who has no license to change the software or create a derivative work. In fact, the user may not even have the source code or have any right to use it. Therefore, techniques which require access to and changes to the source code to implement a correction pose certain difficulties. It is noted that it is unclear whether copyright law itself would prohibit self-help, but certainly evaluation of such considerations might impede a project. As noted above, software owners may include physical impediments to software remediation or software locks which prevent changes to the system.

Known Y2K Maintenance Tools and Techniques

Inspection Phase

The inspection phase involves search through applications to identify all occurrences of date data and calculations and associated data bases. Software inspection tools are typically specialized to focus attention on identification of date data declarations and calculations and comprehension of their context of usage. Some of the more useful tool supported techniques are listed below:

Domain Modeling. Identification of the set of entity classes, inter-entity relationships and operations on entities that are likely to be common to most applications in a given problem domain, such as the Y2K date domain. Many large applications share the same data definitions across many programs and thus have many parts of the same Y2K domain model in common. Consequently, domain knowledge gained in one part of a large application or a database may be transferred and used elsewhere to focus analysis.

Domain Analysis. The systematic process for identifying the presence of a domain model within an application by identifying the correspondence between terminology and operations occurring in the application and the corresponding domain model. Subdomain analysis is a focused form of analysis that locates, identifies and models just the parts of an application that are most relevant to a specific subdomain, e.g. the date domain.

Heuristic Search. The application of focused search techniques that employ insights that are known to be relevant to a problem to accelerate and focus a search for a solution. Heuristic search techniques employ knowledge of the relevance of certain data names, data name components, data types, data structures, data dictionary definitions, the syntax of data declarations and computations known to be relevant to a subdomain to identify declarations and calculations that have relevance to a specific domain model, such as the Y2K date domain model.

Data and Usage Dictionary. A repository or database that defines the data names, aliases and data names and legitimate data value bindings for data usage actually found in programs. Software tools can support the incremental extension of a data dictionary during domain analysis of existing applications or the use of a data dictionary as a reference model for date data or usage identification. A data dictionary can serve as an extensible repository for entity classes, inter-entity relationships, operations and patterns referenced during domain modeling, analysis, and heuristic search.

Automatic Program Documentation. A technique for automatically documenting a program (or selected portions of a program) by augmenting the program listing with definitions or short descriptions from a data dictionary to explain the acronyms used in the programs. Typically source code program listings are full of acronyms which may obfuscate the meaning of the programs to many readers. Automated program documentation can facilitate human identification of date-related declarations and usage in programs by clarifying the context usage by augmenting the program listings with meaningful descriptions extracted from the data dictionary. Automatic Program Documentation can also accelerate the assessment phase by accelerating human interpretation of the meaning of program constructs and the determination of their relevance to the Y2K Problem.

Assessment Phase

The Assessment Phase involves the performance of change impact analysis with respect to the date data usage and calculations to define the corrective action to be taken at the potential sites of change. Change impact analysis involves techniques for recognizing similar patterns of usage throughout an application or application family, clustering groups of similar patterns of usage into clusters, classifying and assessing usage patterns, and annotating usage patterns with a specification for the adaptive maintenance to be performed. A summary of a few of the more conventionally applied tools is given below:

Pattern Recognition. The use of automated and semi-automated techniques to recognize at a syntactical, structural or terminological level (or through general traits recognition techniques) the occurrence of a data declaration or usage across one or more applications. Tools for pattern recognition can be used to automatically identify the potential sites for Y2K change by recognizing parts of programs with correspondences to a Y2K domain model. Pattern recognition can also be used to amplify the human recognition process by automatically searching for other date related data declarations or usage throughout an entire system that are similar to code fragments (matching patterns in a pattern library) that are deemed by humans to be relevant to the Y2K problem.

Pattern-based Cluster Analysis. The formation of groups of similar program constructs based upon pattern similarity that facilitates their comparison with the Y2K domain model to determine their disposition with respect to the Year 2000 date problem. By grouping together similar groups of code, tools for cluster analysis can accelerate the recognition by humans of recurring patterns of usage within an application or across different applications for the presence of data related program constructs and algorithms. Pattern-based cluster analysis can be narrowly focused upon a subdomain to accelerate the assessment process by excluding extraneous details.

Pattern-based Classification. The automated or semi-automated assessment of the significance of a program construct, such as a date declaration or usage to the Year 2000 date problem. Tools can support the classification process by recommending classification for recurring patterns, performing automatic class assignment with verification, or by presenting potentially relevant parts of a program to the human for disposition.

Pattern-based Annotation. The specification for a program construct of a notation that describes the action to be taken for the Year 2000 date problem. Tools for program annotation can support description or prescription of the Year 2000 corrective action by embedding these recommendations as comments in annotated versions of the program listings. These embedded annotations can be used to trigger Y2K corrective actions, such as the application of program transformation and rewriting techniques, in the Correction Phase, discussed below or used to indicate actions to be taken by humans.

Correction Phase

The Correction phase includes the performance of corrections (pattern-based transformations) to the change sites and the recording of the changes that are made to each application. Traditionally, change to software systems is accomplished by humans making manual corrective actions with desktop editors. Such procedures are prone to error and potentially difficult to trace or explain after they are made. Therefore, a pattern-based transformational approach to software change appears to provide a number of advantages over traditional, purely manual, methods.

Transformation. The definition and application of a rule that automatically performs corrective action to software code for a specific type of Year 2000 date construct, whenever the construct is recognized by pattern recognition techniques. Program transformation tools now exist for several programming languages that facilitate definition and application of rule-based program transformations to perform adaptive maintenance. Transformation rules can be systematically defined, reviewed and authorized before programs are rewritten. Using transformation rules rather than humans to actually make the change can be accompanied by automatic insertion of each change as it is made and treating it as a carefully controlled, justified, authorized, (and potentially retractable) transaction with a record of its occurrence made to a log file.

Change Logging. The creation of a register of the location, responsibility, and justification for a change applied by a transformation rule to an application to correct for a Year 2000 date problem. The maintenance process can be made more rigorous though the use of tools that keep a log of all program transformations that are applied to perform adaptive maintenance.

Change validation. A process for human review and approval or denial of a change recommended by a transformation rule. Change validation assures that changes are reviewed and authorized by a human before they are inserted into the affected programs.

Program Rewriting. An automated process for rewriting programs with Year 2000 date corrections installed in the programs. Program rewriting involves regeneration of programs from a knowledge-base while applying authorized change transformations and logging change activities.

Testing Phase

The Testing Phase includes the definition and running of regression tests, including structural and functional tests for each application, needed to assure (i) compliance with testing criteria, and (ii) demonstrate correct behavior under post Year 2000 operational assumptions. Testing may be the most costly aspect of the Y2K change process. Many organizations lack rigorous testing procedures and perform unnecessary testing or inefficient testing. The tool supported testing processes outlined below seek to offer a high level of automated support and narrowly focuses the emphasis of Y2K testing on affected parts of the applications.

Regression Analysis. The analysis of an application or family of applications to distinguish the parts of the application programs that have been changed from those that are unaffected by the maintenance process. Regression analysis can factor out insignificant changes, such as comment introduction, and flag those parts of the programs in which significant changes have occurred. The degree of significance of a change, and even the testing technique that should be used to test a change, can be described in program annotations (comments or log entries) associated with the change.

Regression Testing. Following adaptive maintenance of a system, tests performed to demonstrate that the system changed by the maintenance still performs all functions required prior to the change.

Functional Testing. The construction of a set of tests to demonstrate that the system performs the intended functions as expected. Functional testing is concerned with the behavior of the program (i.e. the test results produced given test inputs). Functional testing should be guided by regression analysis that focuses test case preparation, unit and functional testing upon the changed parts of the programs.

Structural Testing. The construction of a set of tests to assure structural coverage of the program units affected by the maintenance activity. Structural testing is concerned with assurance that affected areas of the programs are executed by the tests that are specified. Structural testing is typically guided by regression analysis to focus test generation upon the changed parts of the programs.

SOURCE CODE RECOVERY

Traditional methods of Y2K remediation require access to accurate source code. If unavailable from an original source, source code may be recovered from compiled modules, through a process which includes: Delinking; Disassembly; Pattern matching; Operand analysis; Internals analysis and Supporting information. The basic concepts behind source recovery rely on the assumption that any program intended for recovery is the end result of a clean compile and link. In other words, the source, at the time it was compiled, was syntactically valid and the program can be run the appropriate system. This method has been applied, for example, to IBM or compatible mainframe computers utilizing the 360/370/390 instruction set. The program contains everything required by the machine to execute the instructions contained in the original source and nothing that is superfluous.

High level language compilers will generate a distinct pattern of machine instructions that can be analyzed and then programmatically stored, retrieved and applied to the programs to be recovered. These patterns may be as simple as a single machine instruction or they may encompass many dozens of machine instructions. Since the genera ted patterns are distinctive, the high level function which generated them may often be inferred from the assembler code, by pattern matching.

The pattern matching technique seeks to recover high level language commands, but does not provide much information about other elements in a program, particularly data items in file descriptions, input and output structures, and the module linkage. These items might be recovered by applying operand analysis. Operand analysis refers to the detailed examination and eventual analysis of the operands of the machine instructions making up the procedure division of the program. The actual operand analysis may occur during both the disassembly and the decompilation of the program being recovered. As each operand is encountered, the probable value based on the machine instruction acting on the operand is determined and stored for later use during the source generation phase of the decompiler.

It is noted that decompilation is a difficult process and has not been completely automated. In fact, it is estimated that roughly 30–35% of the decompilation process may be automated, the remainder of the process being the province of human analysts using sophisticated tools.

DISASSEMBLY

Computer data is stored as sets of bits in a computer memory, which may be a disk, tape or volatile memory. These bits are arranged into larger bytes or words of memory.

In contrast to decompilation, which seeks to produce human-readable codes in a high level computer language, for which fully automated tools are not available, computer programs are available which automatically convert the digital representations, referred to as "machine code", into low level "assembler" code containing assembler instructions. These programs are called disassemblers. A disassembler has an intrinsically simpler task than a decompiler; the disassembler translates and parses the machine readable code into low level assembly instructions, possibly with control flow analysis. Often, there is a simple relationship between the machine readable code and the operators and associated operands.

PROBLEMS WITH SOURCE CODE REPAIR

The solutions currently available for the Y2K problem principally involve a "source code" repair. These repairs are labor intensive, and at least as error prone as any software maintenance project, i.e., the possibility of introducing logical errors or incompatibilities is significant. Further, the corrections may also reveal latent errors or trigger software failure in the original software other than those previously known or related to the date function. Therefore, the testing process after repairs are made is a significant component of the process, requiring substantial efforts to exercise the software in situ while allowing a return to normal operation of the system after testing. Additionally, hardware upgrades may also pose additional testing issues.

U.S. Pat. No. 5,630,118, expressly incorporated herein by reference, provides a system and method for modifying and operating a computer system to perform date operations on date fields spanning centuries. This patent discloses a system that calls a subroutine which seeks to resolve a date ambiguity and execute a correct set of instructions before returning to the main program.

U.S. Pat. No. 5,495,612, expressly incorporated herein by reference, provides a system which executes additional link processes for resolving external references from a load module. Old subroutines are replaced with new subroutines, providing trap instructions at the original placement of entry points of old subroutines. A reference table stores entry points of old version subroutines and new version subroutines.

U.S. Pat. No. 5,668,989, expressly incorporated herein by reference, provides a system which uses biased 2-digit "hybrid radix" numeric fields, having a compressed data format, which supports a date range from 1900–2059. U.S. Pat. No. 5,644,762, expressly incorporated herein by reference, provides a method and apparatus for replacing decimal digits representing dates after 1999 with binary representations in the fields previously reserved for 00–99, spanning a larger permissible range while occupying the same number of bytes.

A number of methods are known for updating software in an operational system, without system unavailability. See, U.S. Pat. Nos. 5,682,533, 5,555,418, 4,954,941, 5,359,730, 5,175,828, each of which is expressly incorporated herein by reference.

U.S. Pat. No. 5,659,751, expressly incorporated herein by reference, provides a system that dynamically links object oriented software components at execution time.

U.S. Pat. Nos. 5,649,203, and 5,507,030, expressly incorporated herein by reference, provides systems that translate software, supporting undefined references that are resolved at run-time by an interpreter.

U.S. Pat. No. 5,459,866, incorporated herein by reference, provides a method for automatically producing job flow specification by analysis of the job control language code and a load module.

SUMMARY AND OBJECTS OF THE INVENTION

The present invention provides a system that automatically analyzes compiled code (e.g., object or machine code) to identify specific program instructions that are to be modified, wherein manual analysis, or even possession or remediation of source code is unnecessary.

Therefore, in a Y2K remediation embodiment, the system relies on identification of the particular instructions or program execution points, e.g., date references or date-related code, in compiled load modules, which are then preferably patched in a manner which do not require alteration of the size of the data field or alteration of the general execution of the program. Since the references or locations within the original compiled program are corrected by discrete patches, this process may even be performed at the time the software module is actually loaded.

In some systems, this "just-in-time" patching is particularly advantageous. Thus, where the load module or other compiled program is compressed or watermarked, or otherwise inaccessible for alteration without significant efforts, after loading in memory, the code may be subject to a patch overlay, containing the discrete changes, prior to execution. In this context, it is also possible to provide a dynamic overlay, which changes during the course of program execution. While the code being executed is fixed, a typical program includes multiple sections, only a portion of which are subject to execution at any given time. This allows, therefore, the logic of the "patch" to be dynamically changed based upon extrinsic circumstances. Therefore, a set of conditions may be defined for introduction of a patch, which may then be removed after the conditions are absent. This selective modification of program logic reduces the possibility of unintended consequences of patch logic and further reduces the testing burden to only those conditions for which the patch logic is executed and the use of the resulting results. Further, in the case of dynamic patching, a number of different conditions may be established, each with a different type of patch logic. A particular advantage of dynamic patching is that, where the conditions are not met, the program remains effectivley unchanged, and therefore the incidence of new errors and impaired program execution efficiency is reduced. The dynamic patching method would be useful, for example, in a Microsoft Windows-type operating system, wherein multiple threads execute simultaneously (e.g., the main program logic, the conditional sensing logic, and the program patching logic), and wherein loading of software modules is controlled through the operating system.

The preferred embodiment of the present invention employs alterations to the operation of the computing system at the most common (and basic) level of programming available, the machine code. Machine code in executable form is typically the result of successful compiling, assembly and linking processes, as well as possible preexisting patches. All higher level computer languages are compiled and assembled into machine code for a specific computer architecture, which is then executed directly by the computing machine under the control of an operating environment. In some instances, code may be compiled for a "virtual machine", which is then implemented on specific hardware. In this case, the patch is typically applied at the level of execution of the program in the virtual machine, and not in the real machine, unless the remediation is specific for flaws in the virtual machine itself, or where functions provided by the virtual machine are particularly adapted for, and used by, program code in a predictable manner for a logical function. In a virtual machine environment, it is possible to virtualize machine behavior, and therefore it is possible to modify both the program logic, to insert traps, calls, and specialized instructions, as well as the virtual machine, to respond to the specialized instructions, in a manner analogous to the addition of new microinstructions to be implemented in hardware.

The present invention can provide modifications at the machine code or assembler code level because the objective of the present system is relatively narrow: to find and correct only that portion of the program that directly or indirectly deals with particular program "events", such as date references; the normal program logic and flow is left intact, and indeed the low level structure is preferably left substantially unaltered, other than the necessary changes, reducing the incidence of creation of or functional discovery of new or latent program flaws.

The process according to the present invention comprises a number of steps, which may be summarized as (1) Inspection, (2) Analysis, (3) Remediation and (4) Storage of Results.

In the first step, inspection, the system is inspected to define the context and relation of program and data elements. Thus, in a relatively high level manner, the state, inputs, outputs, environment, and interrelation of elements is determined.

In the second step, the program logic is analyzed for references to the specified "event", for example, reference to or use of date related data. This step encompasses, for example, disassembly of machine code and tracing of program logic. It is noted that not every instance of a reference to the specified "event" must be altered, and therefore the analysis preferably determines whether such alteration is necessary.

In the third step, the remediation is applied to alter the program logic. In the preferred embodiment, this remediation takes the form of selection of an appropriate alteration of program logic to achieve a desired result, and patching of the program by substitution of simple program flow control instructions for altered program logic, as well as a logic for circumventing remaining program logic which is undesired.

In the fourth step, the revised program logic is stored for execution. While the disassembled code may be reassembled, with the patches, the defined patches in the remediation step may also be applied to directly to unmodified compiled program code, without changing program length by inserting traps to the patch code.

When a mainframe-type computer, e.g., an IBM 360/370/390 class computer, running an operating system (OS/360, OS/370, OS/390), prepares to execute a program, a special file, called a "load module", is transferred from mass storage, e.g., computer disk, tape or other volatile or non-volatile memory, and is stored in the computer main memory space. This load module contains the "link-edit" of one or more "object modules", which result from compilation of programs written, e.g. in COBOL or other computer languages. The link-edit process provides a load module, which includes both header information, as well as program object code. The header defines the contextual information and other aspects of module operation.

According to one embodiment of the present invention, the operating system-level controls, e.g., "Job Control Language" or JCL commands, are scanned and analyzed to determine a sequence of program modules or load modules, the interrelation of load modules and data structures, including external data files and operating system resources. A load module includes both header information, as well as program object code. As noted above, the header provides contextual and control information for the object modules, including load maps, which define the loading parameters for the load module in memory and allows an offset reference to particular code and/or data elements, such as date references, and also define an execution environment for the code. Therefore, the first step in the process may be performed prior to analysis of the object code of the program element.

In order to analyze the program logic, in the second step, an object module, from the load module, at a time prior to execution, is first disassembled into "pseudoassembly code" by a so-called disassembler, a program that converts digital data into assembler code representations of the operations to be performed by the computer. While this conversion is optional, it facilitates logical analysis of the object code. The resulting disassembled code is called pseudoassembly code, because it may differ somewhat in form from the original assembler code from which the load module was assembled and linked; however, it represents the same program logical organization.

In the preferred embodiment Y2K remediation system, the pseudoassembly code is then scanned in great detail to look for any reference to a date in a "data field" or "register", or date derived data produced by logical reorganization of date information. A process of "decompilation" is not required, and indeed this is a principle advantage of the present invention. Since the process for fully automated decompilation of software to high level computer language is not readily available, the elimination of such a requirement facilitates automation and therefore reduces the costs of remediation. These date-related software processes may be identified following logical processes, direct or indirect, on external data which includes date information, and environmental variables, such as reference to a JCL "date card", or by a reference to a clock (hardware or software). The date references may be presented through data structures, including data files, which may be identified as date information by an analysis of the data file specification, context, artificial intelligence or manual intervention. In contrast to the unavailability of fully automated decompilation, this analysis step (as well as the inspection step) can be fully automated using existing tools and paradigms. These tools include syntax analyzers and inference engines, such as CLIPS.

The data files referenced by the program are also analyzed for the presence of date information, for example by a characteristic data format commonly representative of date-related information. Once date-related information is located in a data file, any program logic that references this date location may also be discovered. Likewise, once a date-related program operation is identified in the program logic, any data processed by that logic would be considered date related.

It is noted that the present method is not limited to the processing of date-related programs and data, but rather the present invention provides a new method for automated alteration of the program execution, especially adapted for field overflow exception processing and legacy systems having a number of references to data of a first type which require modification for handling data of a first and/or second type. For example, the modification of computer systems to deal with the new European currency, the Euro, either in addition to or in place of national currencies may be implemented through use of the present invention.

Another example is to modify financial computing systems which operate to compute or receive Dow Jones Index information, which historically has been below 10,000, but is nearing 10,000. In addition, many legacy systems are faced with various unanticipated types of data field overflows, and the present invention may be applied to adjust data processing systems to handle larger or richer data sets than originally provided for (e.g., extra digits on license plates, social security numbers, NSN numbers, other serialized numbers or sets of numbers which require an extra digit or identifier or overflow).

The present invention may also be used to alias or change a reference to a particular data field, program module, function, directory path, or the like, in programs which normally do not allow such alterations. For example, in a Microsoft Windows-type operating system, programs typically call functions contained in so-called DLLs. These DLLs may be stored in a common directory, and in use are integrated with the operating system. The DLLs are separately compiled, and are subject to independent update and replacement from the program itself, and indeed, a DLL may be supplied by a different source than the program itself and thus be updated through a different channel. However, it often occurs that new DLLs do not operate with older software which reference the name DLL having the same name, and that new software does not operate properly with older DLLs. Thus, the present invention provides the possibility of patching the compiled originating program to reference a DLL by a different name (and renaming the referenced DLL) or to patch the DLL to identify the calling program and appropriately execute the old or new DLL program code, depending on source. The patch may also operate on the original program or operating system to selectively redirect DLL calls to different directories (without renaming the DLL itself) based on the identity of the calling program.

This embodiment of the invention therefore requires substantially less inspection of the operating environment of the software, possibly to a point of trivialization. The analysis phase is also simpler, in this case typically employing available tools for determining or analyzing program references, or, in the case of Microsoft Windows NT, 95 and 98, the system registry. The remediation phase, in this case, is preferably in-line, as the magnitude of the changes are such as to make references to external program logic inefficient. Finally, the storage phase is relatively straightforward. It is noted that, in this environment, patches may be made immediately before program execution, after the program is loaded into memory. This is advantageous, for example, where the source of the program is write protected or non-rewritable media (e.g., CD-ROM), or where modifications of the original program is undesired, e.g., in a network computing environment, where the patch is specific for a computing environment and not for all execution of the code.

The present invention may also be applied to remediate embedded systems. In these systems, an exemplar or prototype is fully inspected and analyzed, either through analysis of the code or through a functional analysis of the inputs and outputs. On the basis of this inspection and analysis, a remediation protocol is established. However, in contrast to other embodiments of the invention, the storage of the result may take a different form. In many instances, the compiled code for an embedded system is contained in a non-rewritable memory or in a manner which does not allow for the addition of new program logic. Therefore, in order to avoid replacement of the memory or the embedded system as a whole, the "patch" modifications may be typically be applied at the inputs and outputs of the processor to alter or replace the normal signals, without specifically altering the stored instruction code. In such embedded systems, especially those without advanced security features, it may be possible to analyze the instructions and data of an embedded processor during operation. Typically, replacement of the processor with a revised design is difficult and involved a substantial debugging effort. Further, older hardware may be unavailable. Therefore, the present invention allows a hardware device to be implemented, such as by a Programmable Logic Device (PLD) or microprocessor, to specifically detect the imminence of an undesired event or instruction execution. Therefore, the new hardware device may be placed in the embedded system to analyze the instruction and/or data pattern, and preempt, prevent, or fix the execution in real time. If we presume that the remediation is a rare occurrence, then the new hardware will have little effect operationally on the system as a whole, and will unlikely introduce execution errors and "glitches". The presence of any such glitches may be determined with far lesser effort than debugging an entire new system. It is noted that many embedded systems provide real time control functions. Therefore, it may be critical that the new hardware not alter the timing of program execution. Fortunately, it is likely that older hardware which requires remediation will typically be slower in execution than modem hardware. In many instances, even if the remediation code requires a significantly greater number of program execution instructions, it is possible that the overall timing may be kept constant. Thus, the present invention provides a hardware "patch" embodiment for embedded systems and the like, for which pure software patching is impossible or undesired.

The analysis program according to the preferred Y2K remediation embodiment must identify date references and analyze associated logic. Date references may typically be identified by characteristic data structures and reference thereto within the code. Particularly, it is noted that high level language compilers use characteristic data formats of limited types for date information, e.g., binary, ASCII, packed decimal or binary-coded decimal format, six or eight digit representations, e.g., YYYYMMDD, CCYYMMDD or YYMMDD for date, and counters which provide a relative time since a reference date (e.g. minutes since 01-01-82).

Once a date reference or date derived information is identified, an analysis program analyzes the code and proposes an appropriate logical modification, if necessary, to make the program Y2K compliant. The analysis program thus includes a library of modification types, to fit the pattern of date usages and program context. Where a date reference does not match the specified patterns, an exception may be generated allowing manual intervention or alert to the possibility of inappropriate results. Where immediate correction of the code is deemed unnecessary, the date reference is nevertheless stored, e.g., as part of a table or to ensure that the information is not later used or referenced.

According to a preferred embodiment in a mainframe environment, these date-related data references are stored in a separate table of program offsets. Data from this table may be used as part of a modification process to alter program flow during execution to corrective subroutines, returning program control after subroutine execution to the normal object module code (at a point after the replaced logic), to patch the object module or to help define modifications to the object code.

After the program logical modifications are defined in the analysis procedure, three options are available for implementation. First, the object module may be "patched", i.e., changes are made to the original object module itself, within the same "footprint". Second, the object code may be subjected to trap codes, which are normally reserved for program debugging and high level system operators. In the case of trap codes, program logical flow is redirected with automatic storage of the machine state prior to the trap. After the trap procedure is executed, the program flow may be directed to normally resume at the subsequent instruction to the trap instruction. Third, the pseudoassembly code may be modified and reassembled as a modified object module. In this latter case, any additional code may be provided in any of the foregoing described manners, as jumps, calls, trap codes, references to code in other object modules or in accessible memory, and the additional code may also be appended to the end of the object module or inserted "in-line" with the original code, i.e., interspersed with the original program code. Where in-line modifications are made, the obsolete code may be replaced with new code, or modifying code placed sequentially with the assembly code to correct program execution. This allows potentially greater efficiency and speed of operation, as compared to references to separate program modules. Preferably, in an IBM mainframe environment, the patch code is not placed in-line with the object code, in order to avoid potential for interference with program logic and memory allocation. Further, in the IBM mainframe environment, other than the appropriate insertion of trap or SVC codes and NOP instructions, the object module is preferably not further modified. However, under different circumstances or in differing environments, in-line patching and reassembly of the patched, disassembled code may be appropriate and desired.

The modification may be, for example, a modification of the code to provide a different representation of the year, without expansion of the date field or alteration of program length. This process is termed data compression. Many date references will not require alteration or modification. Some code locations need only have a single "literal" value changed. In cases where code has to be added, a Call Subroutine, Jump or Trap Code is provided, which temporarily redirects program logical flow to a distinct set of program instructions, i.e., located in a different set of memory locations than the original code, allowing additional instructions to be executed, before returning "flow control" to the original object code. This added code may be embedded into a modified object module (by a reassembly process), embedded in an additional object module within the load module, or provided in accessible memory as, e.g., "common code". In cases where code has to be deleted, possibly in conjunction with the use of substitute or additional code, one or more "no operation codes" (NOP) are inserted into the program in place of the deleted instructions, to avoid execution of obsolete instructions, again retaining the logical structure of the original load module. Alternately, especially where Jump instructions are employed to divert program flow, a table of return locations may also be provided which bypass obsolete code.

The trap code may be of a number of different types. First, a so-called supervisor call or SVC instruction may be executed, which, through the normal functioning of the operating system, allows one software module to call another, and upon completion of the redirected execution, returns to the subsequent execution point in the calling program. The SVC is a specific type of machine flow control instruction, of which there are a number of possible variants. As employed herein, the term SVC refers broadly to the general class of machine flow control instructions which act to call a software module from another software module, and ultimately allow return of control to the calling software module, and not limited to the particular instructions which are denominated "SVC". The second involves a so-called microinstruction trap, in which an existing or new microinstruction (i.e., a hardware level instruction which potentially allows a complex functionality) is executed, which diverts program execution from undesired code to remediation code in a separate software module, which after execution of remediation code then returns to the subsequent instruction in the calling program after the microinstruction trap. Finally, the remediation may be implemented entirely as one or more machine microinstructions. In this case, one or more special microinstructions may be provided which specifically execute remediation routines in hardware, without diverting object code program execution to a different high level software module. In all of these cases, existing code which is obsolete must be bypassed, such as by insertion of a jump (JMP) instruction, no-operation instructions (NOP) or by other means.

Where special microinstructions are provided, these microinstructions may be of a novel, data dependent, functionality. Therefore, in contrast to known "conditional" microinstruction operators, which test flags and control program flow based thereon, these special microinstructions may perform operations which follow different logic paths depending on the data, which may include values stored in one or more registers or memory locations. These data dependent instructions are advantageous because they potentially facilitate minimization of program modifications or "patches" of the load module, and allow direct implementation of much of the required remediation, and indeed a resulting patched program may be of such a nature as to allow permanent usage. Further, where the new microinstruction performs a valuable function, it may be more generally used outside the remediation context, as part of normal compiled code.

It is noted that, in terms of program execution efficiency, the SVC and high level machine code flow control may be less efficient than a machine code trap instruction, and a trap instruction may be less efficient than a specific machine instruction for software remediation. However, such machine code trap instructions may not be available for use, and the modification of mainframe microcode to implement special instructions is non-standard and requires low level alterations of the hardware environment.

The present invention also allows dynamic or run-time resolution of the patch. In other words, different logical patch algorithms may be executed depending on the program calling the patch routine and the data being processed at the time. Thus, in some instances, no remediation is necessary, and the original program execution may continue unchanged. In other instances, there may be alternate patch functionality desired for differing data or machine states. Thus, the patch program instructions may examine the various registers and data storage locations, stored tables and even the object code of the source program, to control execution of the patch algorithm. In this way, the patch code may be streamlined, with a minimal number of different but generic remediation algorithms, e.g., five, available to handle the various "fixes" which may be necessary.

The Call Subroutine and Jump instructions provide somewhat different functionality. Each alters the program environment in a different manner. The Call Subroutine instruction places the present program counter and machine state into predetermined registers or onto the stack, which may have limited capacity. Thus, it is possible that a Call Subroutine which was not anticipated by the original programmer could result in a stack overflow. Further, a non-standard programming practice directly accesses the stack, which would not be in the state expected by the original programmer. The Call Subroutine instruction also automatically causes a resumption of program at the instruction immediately after the calling instruction (program counter plus one).

The Jump instruction requires an additional word or two prior to actual jump execution, to define the location of the Jump instruction, to thus define where program execution should recommence after processing of the new instructions. However, a Jump instruction does not alter use of the stack and does not rigidly mandate Return parameters. However, a Jump instruction may be limited in range; the IBM Jump instruction is limited to 4095 bytes.

The trap code is somewhat similar to the subroutine call, but has enhanced hardware support, and it is normally not employed in production software. Therefore, it is unlikely that the use of trap codes will conflict with other concurrent uses in a production software environment; however, where separate uses of trap codes exist, conflicts should be avoided.

Modification of microcode is considered a substantial undertaking, as there exists the possibility of significant and/or unintended alteration of machine operation. However, if appropriate, this allows a very efficient implementation of a remediation solution.

It is noted that, in some cases, the ambiguity created by the overflow of the two-digit representation of year in date-related data was intentionally exploited by the original programmer. Therefore, the system according to the present invention preferably analyzes the pseudoassembly code for these occurrences, to prevent introduction of program logic flaws. For example, if the date-ambiguity problem occurs with dates before 1999 or 2000, for example, or on the date of modification, where program execution appears otherwise normal, then it is possible that the identified "ambiguity" is a normal condition for the program logic.

After the modifications to the program execution are defined and implemented, a revised load module is created. The load module is either patched directly or code is added and re-linked. The revised load module may then be immediately executed, or returned to mass storage for later execution. Preferably, the load modules are preprocessed and stored in remediated form.

The original load module may be compared for performance against the modified load module, both during normal operation and specialized testing to determine year 2000 compliance.

As can be seen, the process according to the present invention may be executed in advance, to provide a set of patched load modules, or on the spot, i.e., in a preparatory stage for load module execution. Therefore, the present invention may be used in environments where code is subject to frequent updates, maintenance, or repair. More specifically, as an adjunct to source-code level modifications of massive software systems, the present invention allows unmodified code and partially modified code to be used in systems to test manually modified code. Thus, according to the present invention, source code may be modified sequentially, debugging each source code module independently, rather than requiring complete systems to be modified prior to testing. Further, the present invention also allows for the automated identification of potential year 2000 compliance issues at a load module level, by an analysis of any changes made to the code.

If program source code of the program is later modified for year 2000 compliance, the modifications of the corresponding revised load module according to the present invention will be either eliminated, or any changes made insignificant (from a logical standpoint) to program execution. Further, object modules which interact with revised object modules may also be automatically modified to assure system operation. Thus, the present invention is compatible with manual efforts applied where the efficiency and accountability of optimized source code are necessary, while allowing automated fixes and patches according to the present invention, e.g., in other cases, where potential inefficiencies, i.e., increased program execution times due to trap execution latency and disruption of program logical flow, are tolerable. The system according to the present invention is thus compatible with ongoing programs of program maintenance, as a tool for prioritizing manual recoding, while permitting continually updated system operation.

As a part of a software maintenance process, the present invention may be used to automatically test algorithmic "fixes" to the program before manual efforts at modification of the source code are implemented. Thus, the analysis program may be fully automated or controlled at a very fine level. The types of modifications and the pattern analysis applied may also vary according to specific circumstances.

The system and method according to the present invention thus eliminates the need for access to source code in making a software system year 2000 compliant, and thus absent or deficient source code systems, or systems written in unknown or "obsolete" languages, may be modified. The level of manual efforts is potentially reduced, and the speed of modifications is increased, due to the highly automated nature of the process. Due to the ability of the system and method according to the present invention to automatically alter entire systems to achieve compliance, information technologies management may prioritize the staffing allocation to manual analysis and maintenance of code, without regard for the availability of source code and with project completion dates after the dates at which program execution flaws would normally have become evident. The system and method according to the present invention also reduce or eliminate the risk of introducing new program execution flaws, such as often occur during even routine source code maintenance or repair, and provide a benchmark for comparison of manually modified programs.

Table 1 provides a comparison between the traditional source code remediation method according to the prior art and the object code remediation according to the present invention.

TABLE 1

| SOURCE CODE REMEDIATION | | OBJECT CODE REMEDIATION | |
|---|---|---|---|
| Analysis | 18% | Analysis | 18% |
|  |  | Remediation (patching) | 2% |
|  |  | Testing | 30% |
| Source Code Remediation | 30% |  | 50% |
| Translation into Machine Code | 1% | The computer program will function as if it were totally Y2K compliant after only 50% of the work. |  |
| Unit Testing of New Machine Code | 21% | When convenient Source Code Remediation | 30% |
|  |  | Translation into Machine | 1% |

TABLE 1-continued

| SOURCE CODE REMEDIATION | | OBJECT CODE REMEDIATION | |
|---|---|---|---|
| System Testing | 30% | Code |  |
|  |  | 100% Testing | 19% |
|  |  |  | 50% |
| The computer program will only be fully Y2K compliant after 100% of the work and testing has been completed. | | This final stage of source code remediation can be postponed until after the year 2000. | |

Source Code Remediation vs. Object code Remediation. Object code remediation is more desirable than source code remediation for a number of reasons, even though, ideally, the source code should be remediated in either case. The key difference is that a two phase, object code then source code remediation bridging solution, will make a program Y2K compliant in half the time it would take to use source code remediation. The program's source code still won't be modified, but the program will work—it will perform all date calculations correctly, before, during, and after the transition to Year 2000, allowing some work to be deferred, and the source code to be remediated at a convenient time, or even replaced, as appropriate.

Each of the fundamental processes required for remediation contains similar segments of work. It is useful to look at the length of time each process takes. Since the actual time will depend on the size of the project, percentages of the total time it takes to do each portion of both processes are useful metrics. Each process requires:

Inspection and Analysis. This is a survey that must be taken of the computer program, to see what has to be done to make it Y2K compliant. This takes about 18% of the time, in either process.

SOURCE CODE MODIFICATION, OR REMEDIATION

Source Code Modification, or Remediation. This is the actual code fixing, itself. It takes 30% of the effort, in either process. But with an object code patching method, the Source Code remediation is done after the program has been put into production, where it will function fully and accurately. In other words, object code patching, or "Bridging" quickly enables program to become usable after Year 2000, even though its source code has not yet been modified.

Translation into Machine Code is the actual compilation of source code into object code. This takes only 1% of the time, in either process.

Testing requires the same amount of time, also—approximately 50% of the effort. This is a vital component, and it's broken down into two parts: Unit Testing of New Machine Code, and System Testing.

Move to Production Mode: This step can be done prior to source code remediation if the object code remediation is chosen, resulting in a net savings of 50% of the elapsed time. Comparing the two lists, it is apparent that bridging solutions can save time. The sequences are not identical, but it's easy to see that a Bridging Solution enables system operation right after the first testing component—before the lengthy Source Code Modification is even started. A primary advantage of Bridging Solutions, is that they make systems work in about half the time it would take using traditional methods.

There are three general classes of bridging solution approaches; data centric, logic centric, and encapsulation.

Data centric approaches can be further divided into three types: (a) Date Compression, which fits four digit years into a space normally used for two; (b) Data Expansion, which finds space for an extra two digits for each of the years in every data record; and (c) Date Windowing or Pivoting, which interprets 2-digit dates above a pivot point (for example, 28) as being in the 20$^{th}$ century, and 2-digit dates below the pivot point as being in the 21$^{st}$ century. For example, if one chooses a Windowing approach using a 2-digit pivot point of 28, then 29 would be interpreted as meaning 1929, whereas 27 would be interpreted as meaning 2027. Clearly, date windowing or pivoting approaches have disadvantages when dealing with a variety of business issues, but it can offer an easy solution for problems which can fit within this scope.

The logic centric approach examines the logic to see which segments relate to dates. Then it identifies those segments that do not have Year 2000-compliant logic—that is, segments that cannot process dates correctly as of Jan. 1, 2000. New logic is then installed in those segments, at the Object Code level.

Encapsulation techniques provide a barrier wall of logic around the program that's not compliant, either isolating it from other computers, or from other communication lines that might not be compliant. Alternately, a piece of logic can be installed just outside the boundary of the program, which translates the dates in such a way as to make the non-compliant program, together with the external transformation, compliant as a whole. This encapsulation technique is analogous to the proposed solution for embedded systems, wherein hardware is added to the system which encapsulates the processor to selectively force valid inputs and outputs.

It is therefore an object of the invention to provide a system for altering an execution of a programmable system, comprising the steps of analyzing program execution code, without decompilation, to identify the prospective occurrence of a condition; interrupting or preventing the occurrence of the prospective condition and controlling the system to replace the condition with an alternate condition; and resuming execution of the program execution code after the prospective occurrence of the condition.

It is also an object of a preferred embodiment of the invention to provide a method and system for modifying computer program logic with respect to a selected data type, e.g., date-related data, the program logic being divided into a plurality of load modules whose execution is controlled by an operating system, comprising the steps of analyzing operating system instructions to determine a sequence of load module execution; analyzing object code logic from the load module and data to identify references to the selected data type; modifying the computer logic embodied in the object code with respect to the selected data type to modify computer program logical execution with respect thereto, substantially without decompilation or reference to source code; and storing information representing the modified object code computer program for execution in accordance with the operating system instructions. The object code computer program modifications are preferably implemented without alteration of overall program logical flow with respect to data types other than the selected data type.

The object module may be patched, e.g., with subroutine calls, jumps, subjected to traps code execution, or disassembled object code modified and reassembled. According to a preferred embodiment, an object code string length remains unaltered, e.g., the object code is modified by substituting digital information elements having a same length as digital information elements of the unmodified object code, although other embodiments of the invention provide new code added to the terminus of the object module and/or in-line with the pre-existing code.

Also in a preferred embodiment, the operating system controls operation of an IBM mainframe compatible computer, for example MVS, executing on an IBM 360, 370, or 390 computer system.

Preferably, the object code is disassembled to pseudoassembly code for analysis. Where modifications are performed to the pseudoassembly code, as compared to patches to the object code and the use of trap tables or the like, the modified pseudoassembly code is then assembled into a modified object module.

The information from the object module is preferably analyzed to determine a reference to the data type or transformation of the data type. Where the data type is date data, this data often assumes characteristic formats, and operations thereon correspond to the formats, allowing inferential determination of such date data references.

The object code is preferably modified, where the modification requires a larger number of bytes than any code replaced, by inserting an instruction to temporarily redirect program logical execution to new program logical instructions, following which, logical execution of the program resumes.

BRIEF DESCRIPTION OF THE DRAWING

The preferred embodiment of the invention will be shown by way of the Figures of the drawings, in which:

The FIGURE shows a flow chart for operation of a preferred embodiment of the invention.

DETAILED DESCRIPTION OF THE PREFERRED EMBODIMENT

EXAMPLE 1

The process starts at 100 with a retrieval of the JCL code 104 defining the use of the software. The JCL code is, in an inspection process, analyzed 102, including the load map and context, to determine the sequence, nature, interrelation, requirements for execution and external references of the load module 108.

The load module 108, transferred from mass storage, without execution, but in its executable state, is then disassembled 110 into "pseudoassembly code" by the disassembler program, i.e., converted from digital data into assembler code representations of the operations to be performed by the computer.

The pseudoassembly code is then scanned and analyzed 112 in great detail to look for any direct or indirect reference to a date in a "data field" or "register", or a transfer, comparison or other operation of data with respect to previously identified date-related data or logical transformation thereof. Likewise, the data records are analyzed for the occurrence of data formats commonly associated with date data. Date data may also be identified by a direct reference to a clock (hardware or software), other system level resource providing date-related information, such as a so-called "date card".

These identified date references are then stored as date reference offsets 116 for later use. The date references may also be presented through data structures, and the data structures are also analyzed to identify date-related data. The analysis is also dependent on the JCL and load map to provide context for the analysis and to identify parameters which are received or transmitted by the software module.

References to date-related data may thus be identified in a number of ways. High level language compilers produce characteristic data formats of limited types for date information, e.g., binary, ASCII, packed decimal or binary-coded decimal format, six or eight digit representations, e.g., YYYYMMDD, CCYYMMDD or YYMMDD for date, and counters which provide a relative time since a reference date (minutes since 01-01-82). Further, once a date-dependent parameter is identified, any logical manipulations, transformations or transfers of this parameter may be tracked and accommodated. It is noted that, where for example, the YYYYMMDD or CCYYMMDD date formats are employed, typically the program logic will be Y2K compliant, while where the YYMMDD format is used, unless particular logic is used to resolve ambiguities, Y2K related flaws may exist, depending on the use of the date-related data.

Once the date references are identified, an analysis program analyzes the code and defines an appropriate logical modification 118, if necessary, to achieve the desired functionality, i.e., to make the program Y2K compliant. The analysis program thus includes a library of modification types, to fit the pattern of date usages and program context. Where a date reference does not match the specified patterns, an exception may be generated allowing manual intervention or alert an operator to the possibility of inappropriate results.

The modification may be, for example, a modification of the data or program code to provide or accept a different representation of the year, without requiring expansion of the date field with resultant increase in data record or program length. This representation may include a sliding window function that allows logical consistency. The sliding windows may be removed or normalized for any program outputs. In cases where ambiguity of the date reference is inconsequential, alteration or modification may be unnecessary, and the code may remain unchanged.

In applying a sliding window function, code locations need only have a single "literal" value changed, for example by the addition or subtraction of an integer window offset. In cases where code has to be added, a subroutine call, jump instruction or "trap" is inserted into the code which temporarily redirects program logical flow to a separate memory location, allowing additional instructions in a subroutine to be executed, before returning "flow control" to the load module. Code in the original object module which would be erroneous or redundant, is replaced with one or more "no operation codes" or a Jump instruction to bypass the undesired code, again maintaining the offset relationships of remaining code. The system may reference common code to implement modifications, such as a separate object module or even common code which persists in memory during execution of various load modules. The individual load modules or even object modules may also be modified.

In operation, the object code remediation system according to a preferred embodiment initially inspects and analyzes the code, which is preferably an automated process, but need not be. The analyzer, manual or automatic, will examine a so-called Control Section (C-SEC), and produce a Non-Compliance Data File (NCDF) as output. The following steps are performed to identify non-compliant object code:

1. Disassemble the load module into object code modules
2. Process the disassembled program with an inference engine, e.g., CLIPS, C-Language Integrated Production Systems, a state dependent analyzer, and through "filter" algorithms or other intelligent systems, to perform a detail analysis for these categories:

Data and program flow analysis to separate process logic from data manipulations I/O code analysis to determine the points in the code where data records containing dates are read in from storage I/O buffer usage tracking to follow the date fields as they propagate through the program logic and expressions Analysis of calculations which are affected by any of the date fields which have been located Application of a rules based transformation, inference engine and state dependent analyzer, to locate calculations Once the instruction sequences, which are not year 2000 compliant, have been located, and an NCDF has been produced, the Object Code Patcher is executed. The Object Code Patcher replaces the identified instruction sequences with a Supervisor Call (SVC), followed by as many NOP (no operation) words as necessary to cover the remainder of the instruction sequence. The Object Code Patcher also creates a Runtime Patch Data File (RPDF). This file is used by a runtime support environment when the inserted instructions are executed, and describes how the transformed code should execute.

An NCDF editor allows a user to examine code produced by the analysis module. An NCDF contains a header record followed by a record for each instruction sequence to be remediated, and contains, for example, the following information:

Signature string that identifies the file as an NCDF

The library and load module names

The date and time of the analysis

A summary of invocation parameters

The number of instruction patch records for the remediated load module

Each instruction patch record, for example, contains:

The offset of the instruction within the load module

The length of the instruction

The data bytes of the original instruction

The instruction operands

Data required by the patch type to perform its operation

Active patch flag

The NCDF is the direct input to the Object Code Patcher create process, that utilizes data from the instruction patch records to create a so-called Zap Deck and RPDF. The Zap Deck contains directives which verify that all the bytes to be replaced have the expected values. Following these are directives which replace these bytes with SVC (or other type of machine flow control instruction), and NOP instructions, as described above. The Zap Deck is executed by IMASPZAP, an OS/390 (MVS) system utility that uses the Zap Deck as input. The RPDF is created as an assembly language source file containing only data directives; i.e. it does not contain any operating instructions. This file is then assembled, resulting in the RPDF.

The load module containing the SVC instructions is the remediated program in Y2K compliant form. When the remediated load module is executed, each inserted flow control instruction transfers control to a separate software module, e.g., the SVC module (which is the runtime support environment). The software module searches the RPDF for the record which corresponds to the particular location at which the SVC was executed. This record describes the remediation behavior to be executed.

The RPDF consists of a header record, followed by one patch data record for each instruction patch in the NCDF. The header record contains:

The library and load module name
The number of sub-records
Space reserved for SVC usage.
Each patch data record contains:
The patch type
Control Section (C-SEC) offset of the patched instruction (the address of the SVC)
Parameter data which the SVC, uses to execute the patch When SVC starts running, it loads a library of patch modules. There is one of these modules for each type of patch that can be applied. When SVC needs to execute a patch, it calls the patch module specified by the RPDF record, passing a parameter block which contains information determined at analysis time. The library module then executes the patched code, and returns to SVC, and then to the remediated program.

After the necessary modifications are analyzed, the modifications necessary to the load module to provide the modified functionality as described above are thus defined 120. The defined modified load module 124 is then saved 122. The modified load module 124 may include an external reference table for trapping date exceptions or otherwise controlling program execution, as well as modified and/or additional object modules. For example, additional load modules may provide input and output data reformatting and/or transformation using a sliding window technique, which might possibly alleviate the need for modifications to the original object modules within the load module 108.

The stored modified load module 124 is subsequently executed by evaluation of the JCL referencing command 126 in the normal sequence of program execution. It is noted that the modified load module 124 may be generated in advance of use or the entire procedure applied immediately prior to program execution. After execution of the modified load module 126, normal program execution continues, indicated by the stop 128, which may include execution of other load modules, modified load modules, or the modification and execution according to the present invention of other load modules.

There has thus been shown and described novel object code remediation systems, which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for automatically modifying computer program logic with respect to a selected data type, comprising the steps of:
   (a) analyzing object code representing computer program logic from the computer program to identify references to the selected data type, substantially without reference to or reconstruction of source code, wherein the object code representing computer program logic is analyzed by one or more processes selected from the group consisting of:
   disassembly, further comprising the step of applying inferential analysis and state dependent analysis to the disassembled object code representing computer program logic,
   scanning data files referenced by the object code representing computer program logic to locate data formatted as date data, and
   tracing presumed references to the selected data type through a logical flow of the computer program logic;
   (b) modifying the computer program logic with respect to the selected data type to alter computer program logical execution with respect thereto; and
   (c) storing information representing the modified computer program logic for execution.

2. The method according to claim 1, wherein the object code representing computer program logic is modified by substituting elements, substantially without changing a length or arrangement of the object code.

3. The method according to claim 1, wherein the object code representing computer program logic is modified by replacement of an instruction with a subroutine call instruction.

4. The method according to claim 3, further comprising the steps of replacing an instruction of the object code with a no-operation code.

5. The method according to claim 1, wherein the object code is modified by replacing an instruction of the object code with a jump instruction.

6. The method according to claim 1, wherein the object code is modified by replacing an instruction of the object code with a trap instruction.

7. The method according to claim 1, wherein the object code is modified by replacing an instruction of the object code with a new machine instruction.

8. The method according to claim 7, wherein the new instruction is a data-dependent instruction, having at least two functions selectively executed depending on a value of stored data.

9. The method according to claim 1, wherein modified program logic is represented in a separate object code module from the object code representing computer program logic.

10. The method according to claim 1, wherein the object code representing computer program logic is modified by a patch.

11. The method according to claim 1, wherein the object code representing computer program logic is analyzed by a process comprising disassembly, further comprising the step of applying inferential analysis and state dependent analysis to the disassembled object code representing computer program logic.

12. The method according to claim 1, wherein the selected data type comprises date-related information.

13. The method according to claim 1, wherein the computer program logic executes on an IBM mainframe compatible computer.

14. The method according to claim 1, wherein the computer program logic executes under an operating system selected from the group consisting of IBM MVS, VM, OS400 and OS2.

15. The method according to claim 1, wherein said analysis is automated.

16. The method according to claim 1, wherein the object code representing computer program logic is included in a load module, each load module also including a load map defining a computing environment of the object code.

17. The method according to claim 16, wherein a sequence of load module execution is defined by a series of Job Control Language statements.

18. The method according to claim 1, wherein said analyzing comprises scanning data files referenced by the object code representing computer program logic to locate data formatted as date data.

19. The method according to claim 1, wherein said analyzing comprises tracing presumed references to the selected data type through a logical flow of the computer program logic.

20. The method according to claim 1, wherein the data having the data type is presented to the computer program logic as a set of data records, each data record having a length, said modifying comprising altering a data format without altering a data record length.

21. The method according to claim 1, wherein said modifying comprises inserting an instruction to temporarily interrupt program logical execution to allow execution of new program logical instructions, following which logical execution of the computer program logic resumes.

22. A method for automatically modifying computer program logic organized as one or more object code modules, comprising the steps of:
   (a) analyzing object code logic to identify instances of a desired change, wherein the object code logic is analyzed by one or more processes, selected from the group consisting of:
   applying inferential analysis and state dependent analysis to disassembled object code,
   scanning data files referenced by the object code to locate data formatted as date data, and
   tracing presumed references to the selected data type through a logical flow of the object code;
   (b) modifying the object code embodied in the computer program logic with respect to the desired change to modify computer program logical execution, substantially without decompilation or reference to source code; and
   (c) storing information representing the modified computer program logic for execution.

23. A method for modifying computer program behavior resolve an ambiguity, comprising:
   (a) identifying an ambiguous reference in a computer program;
   (b) analyzing the ambiguous reference to determine a likely resolution, wherein the ambiguous reference is analyzed by one or more processes selected from the group consisting of:
   applying inferential analysis and state dependent analysis to the computer program, scanning data files referenced by the computer program to locate data formatted as date data, and
   tracing presumed references to the selected data type through a logical flow of the computer program;
   (c) defining an alteration to the computer program execution to implement the determined likely resolution; and
   (d) applying the alteration such that the determined likely resolution is executed during normal execution of the computer program.

24. The method according to claim 23, wherein said applying comprises applying a patch to said computer program to alter an external reference.

25. The method according to claim 23, wherein said applying comprises altering a parameter of an operating system under which the computer program executes.

26. The method according to claim 23, wherein said applying comprises altering externally referenced program logic to selectively execute in a manner dependent on an invoking program.

27. A method for automatically modifying computer program logic, comprising the steps of:
   (a) analyzing object code logic of the computer program by applying inferential analysis and state dependent analysis to the object code logic to define instances of a desired change;
   (b) modifying the object code in line to effect the desired change in object code logic, substantially without decompilation or reference to source code; and
   (c) storing information representing the modified computer program logic for execution.

28. The method according to claim 27, wherein said analyzing comprises scanning data files referenced by the object code to locate data formatted as date data.

29. The method according to claim 27, wherein said analyzing comprises tracing presumed references to a selected data type through a logical flow of the object code.

30. A medium for storing a program executable on a computer for automatically modifying object code of another computer program, comprising logical instructions for:
   (a) analyzing object code logic of the other computer program by performing an analysis selected from one or more of the group consisting of:
   applying inferential analysis and state dependent analysis to the object code logic to define instances of a desired change,
   scanning data files referenced by the object code to locate data formatted as date data, and
   tracing presumed references to a selected data type through a logical flow of the object code;
   (b) modifying the object code to effect the desired change in object code logic, substantially without decompilation or reference to source code; and
   (c) storing information representing the modified object code for execution.

31. A computer system for automatically modifying object code of a computer program, comprising:
   (a) means for analyzing object code logic of the other computer program by performing an analysis selected from one or more of the group consisting of:
   applying inferential analysis and state dependent analysis to the object code logic to define instances of a desired change,
   scanning data files referenced by the object code to locate data formatted as date data, and
   tracing presumed references to a selected data type through a logical flow of the object code;
   (b) means for modifying the object code to effect the desired change in object code logic, substantially without decompilation or reference to source code; and
   (c) means for storing information representing the modified object code for execution.

* * * * *